United States Patent [19]

Mein

[11] Patent Number: 5,139,282
[45] Date of Patent: Aug. 18, 1992

[54] SHOULDER BELT COMFORT SPRING

[75] Inventor: Charles R. Mein, Walled Lake, Mich.

[73] Assignee: General Motors Corporation, Detroit, Mich.

[21] Appl. No.: 696,465

[22] Filed: May 6, 1991

[51] Int. Cl.$^5$ ............................................. B60R 22/00
[52] U.S. Cl. .................................. 280/808; 242/107.2
[58] Field of Search .................... 280/801, 808, 806; 297/483, 468, 476, 479; 242/107, 107.2

[56] References Cited

U.S. PATENT DOCUMENTS

| 3,241,882 | 3/1966  | Fredericks      | 297/385      |
|-----------|---------|-----------------|--------------|
| 3,277,855 | 10/1966 | Roing           | 112/413      |
| 3,279,851 | 10/1966 | Hinchliff       | 297/385      |
| 3,415,536 | 12/1968 | Weman           | 280/150      |
| 3,429,614 | 2/1969  | Huggins         | 297/388      |
| 3,462,192 | 8/1969  | Fredericks      | 297/389      |
| 3,807,798 | 4/1974  | Mattson         | 297/386      |
| 4,033,594 | 7/1977  | Lindblad        | 297/389      |
| 4,118,068 | 10/1978 | Fohl            | 297/385      |
| 4,225,185 | 9/1980  | Krzok           | 280/801      |
| 4,288,097 | 9/1981  | Ueda            | 280/802      |
| 4,341,359 | 7/1982  | Jahn            | 242/107      |
| 4,402,528 | 9/1983  | Fohl            | 280/808      |
| 4,480,853 | 11/1984 | Ando et al.     | 280/808      |
| 4,484,766 | 11/1984 | Buchmeier       | 280/808      |
| 4,607,864 | 8/1986  | Kouketsu et al. | 280/808      |
| 5,054,815 | 10/1991 | Gavagan         | 280/808      |

Primary Examiner—Charles A. Marmor
Assistant Examiner—Paul Dickson
Attorney, Agent, or Firm—Charles E. Leahy

[57] ABSTRACT

A seat belt system conventionally includes a shoulder belt deflected across the occupant torso by a guide loop and wound upon a reel having a spring winding the belt taut about the occupant torso so that forward movement of the occupant in the seat is enabled by unwinding of the belt from the reel against the bias of the winding spring. An auxiliary spring is interposed in the shoulder belt system between the retractor and the occupant and is effective to permit limited contraction and extension of the seat belt independent of the winding and unwinding of the belt by the retractor. The auxiliary spring has a normal position adapted to retain the belt contracted when the occupant is seated stationary in the seat, and enables limited extension of the belt to accommodate breathing and limited forward movement of the occupant during normal wearing of the belt without unwinding the belt from the reel. The auxiliary spring is preferably associated with the guide loop and permits about 20 millimeters of extension from the contracted position at a spring rate of 60 newtons per meter before the belt begins to unwind from the retractor.

1 Claim, 5 Drawing Sheets

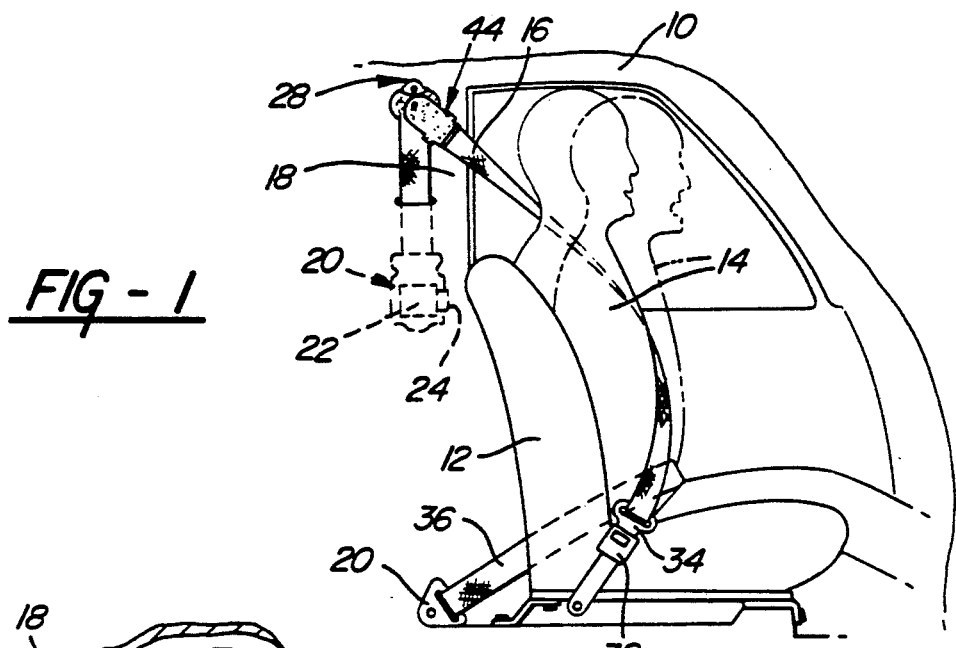
FIG-1
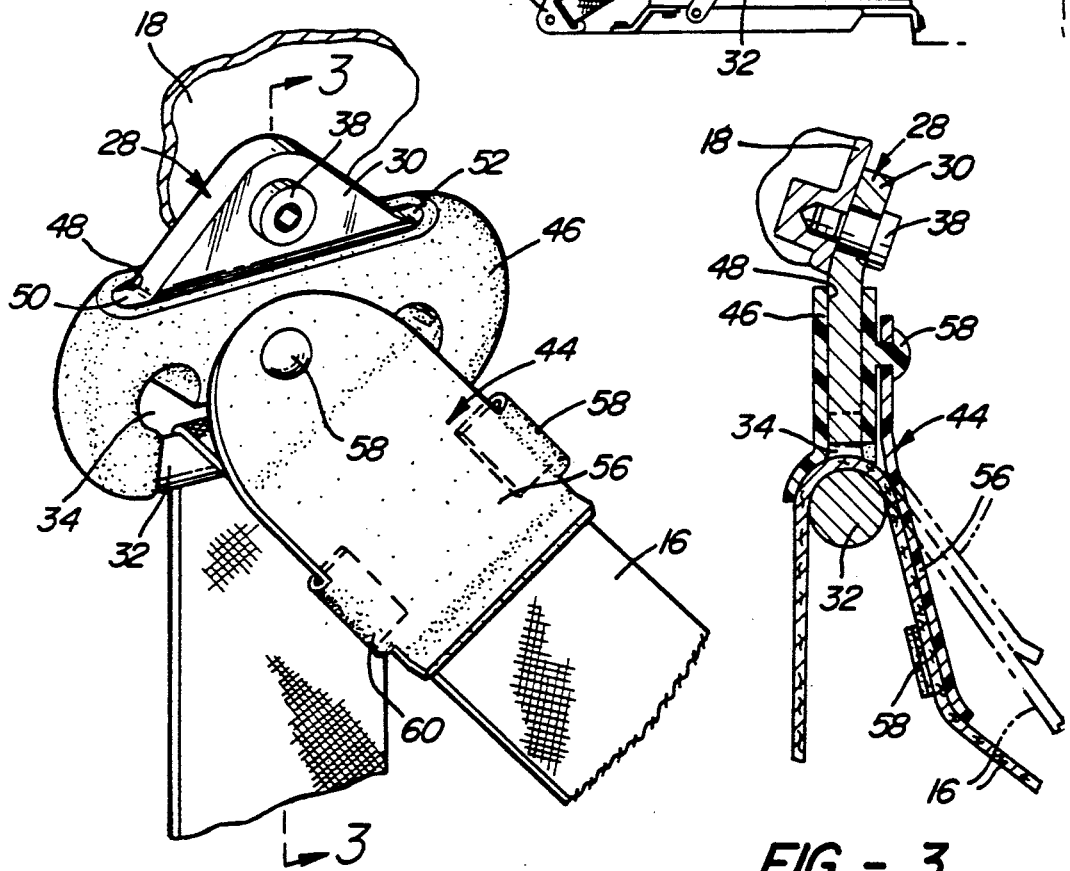
FIG-2
FIG-3

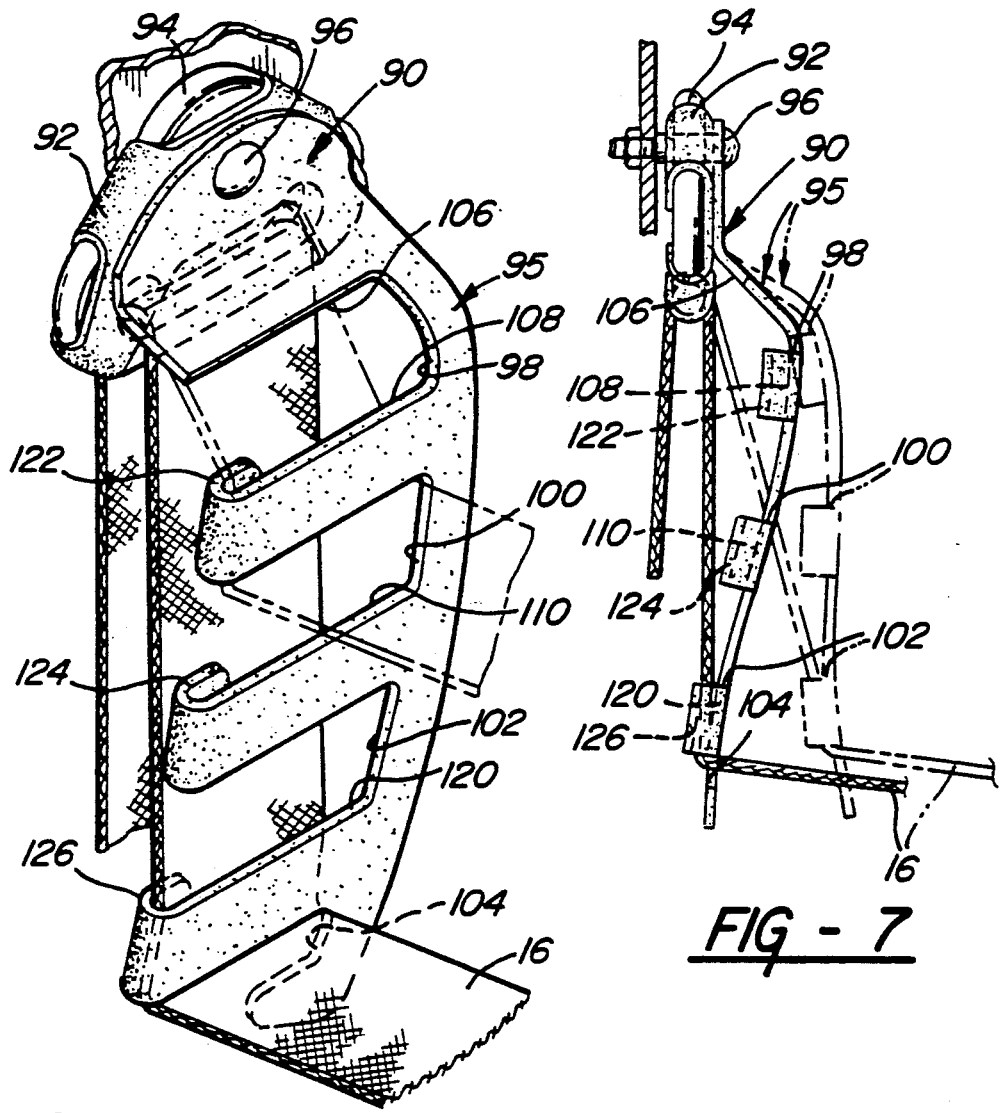
FIG-6
FIG-7
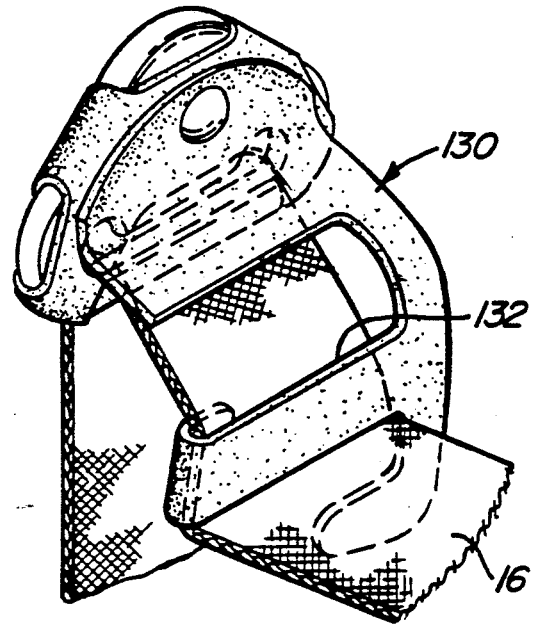
FIG-8

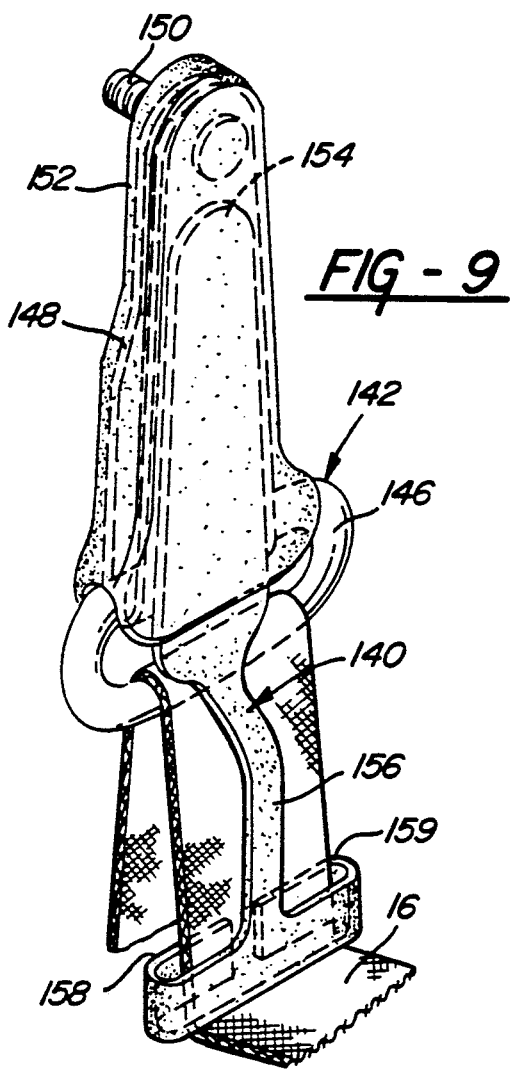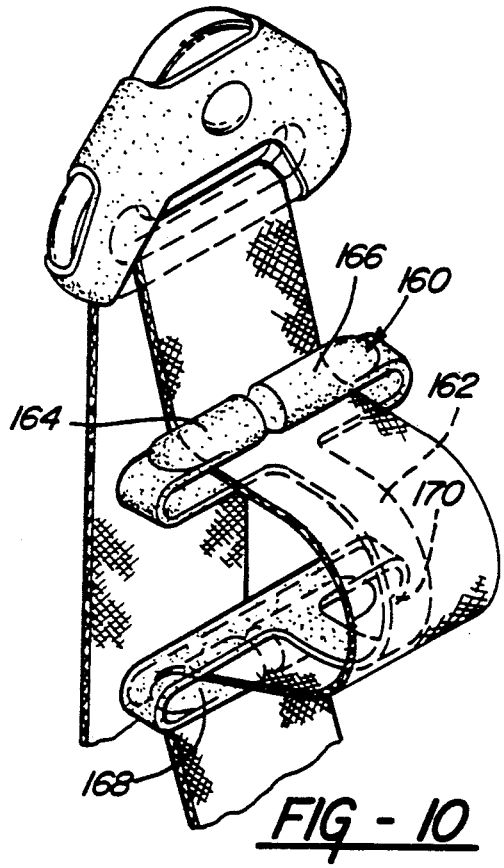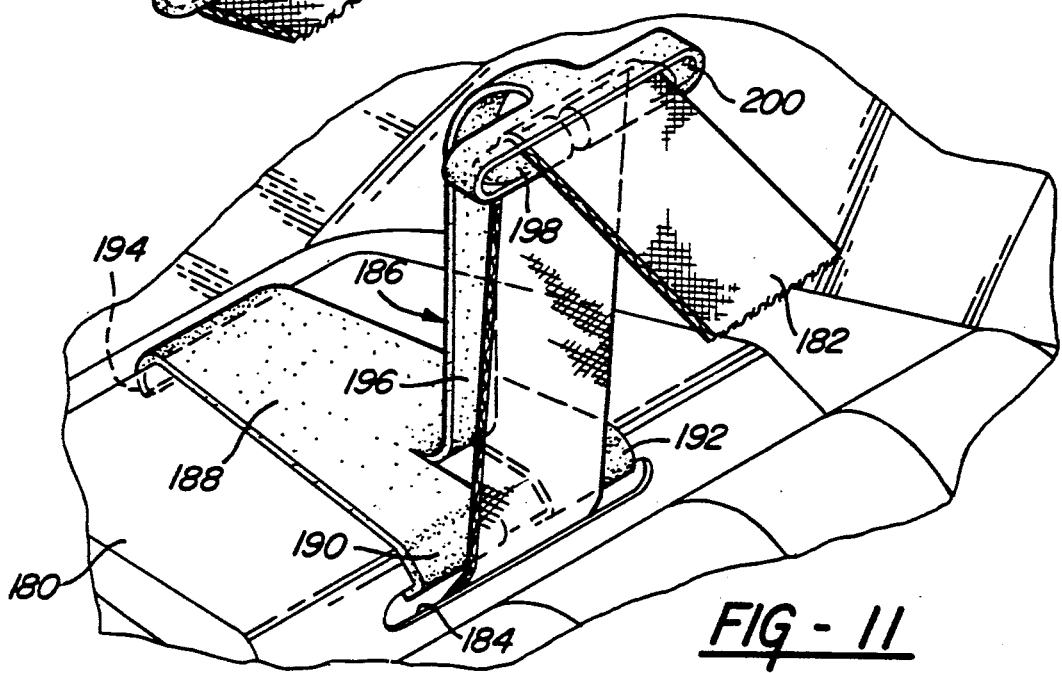

SHOULDER BELT COMFORT SPRING

FIELD OF THE INVENTION

The invention relates to an auxiliary spring interposed in a vehicle shoulder belt system and adapted to provide low resistance to forward leaning movement of the occupant without unwinding belt from the reel.

BACKGROUND OF THE INVENTION

It is well known in vehicle occupant restraint systems to provide a shoulder belt which has an outboard end mounted on the vehicle pillar by a retractor, and an inboard end releasably connected to the vehicle by a buckle. A guide loop mounted high on the pillar deflects the shoulder belt diagonally across the occupant upper torso. The retractor includes a reel with the belt connected thereto and a winding spring urging belt winding rotation of the reel to pull the belt taut about the occupant torso.

It is well known that the winding effort of the spring pulling the belt taut against the occupant can be perceived as uncomfortable by some occupants. Accordingly it is desirable to design the shoulder belt system to provide sufficient winding bias on the belt to maintain the belt in a properly taut condition about the occupant, and yet the belt not be so taut as to be uncomfortable to the occupant.

In addition, it is desirable that the shoulder belt system comfortably accommodate forward leaning movement of the occupant to reach vehicle controls.

I have discovered that the forces exerted on an occupant by a shoulder belt can be considerably greater when the belt is being extended form the retractor than when the belt is being retracted. For example, FIG. 12 plots the force imposed on the sternum by the shoulder belt, vs. the forward displacement of the upper torso. The plot designated "A" shows that the force exerted on the sternum rises rapidly from 2 newtons to about 9 newtons within the first 20 millimeters of forward motion of the shoulder. This same plot "A" shows that the force on the sternum remains about constant at 9 newtons as sternum displacement continues forwardly, and then, the rearwardly leaning movement of the upper torso causes the force on the sternum to fall off rapidly to about 2 newtons as the belt is being retracted.

I have also studied the subjective reactions of belted occupants and determined that occupants are particularly sensitive to the belt loadings which occur within the first 20 millimeters of forward movement as it is these motions which are most often made involuntarily by the occupant as the occupant breathes or subtly shifts his position to accommodate vehicle decelerations, cornering, etc. Forwardly leaning motions which occur beyond 20 millimeters are more likely to be intentionally made by the occupant and as such the occupant is not subjectively averse to feeling the force of the shoulder belt imposed on his shoulder as he leans forward.

In view of the forgoing I have discovered that it would be desirable to provide a shoulder belt system which could provide a low belt effort on the occupant during forward occupant displacement of about 20 millimeters.

Accordingly, the object feature and advantage of the invention resides in the provision of a auxiliary spring which is interposed in the shoulder belt system between the retractor and the occupant and is effective to permit limited contraction and extension of the belt independent of the winding and unwinding of the belt by the retractor.

SUMMARY OF THE INVENTION

According to the invention, a seat belt system conventionally includes a shoulder belt deflected across the occupant torso by a guide loop and wound upon a reel having a spring winding the belt taut about the occupant torso so that forward movement of the occupant in the seat is enabled by unwinding of the belt from the reel against the bias of the winding spring. An auxiliary spring is interposed in the shoulder belt system between the retractor and the occupant and is effective to permit limited contraction and extension of the seat belt independent of the winding and unwinding of the belt by the retractor. The auxiliary spring has a normal position adapted to retain the belt contracted when the occupant is is seated stationary in the seat and enables limited extension of the belt to accommodate breathing and limited forward movement of the occupant during normal wearing of the belt without unwinding the belt from the reel. The auxiliary spring is preferably associated with the guide loop and permits about 20 millimeters of extension from the contracted position at a spring rate of 60 newtons per meter before the belt begins to unwind from the retractor. The auxiliary spring may be in the form of yieldable plastic belt support mounted on the guide loop and depending therefrom to bear upon the belt between the guide loop and the occupant. The belt support is effective to deflect the belt from the fully extended position to a condition of limited contraction so that limited forward movement of the occupant is accommodated by yielding of the belt support permitting the belt to extend without unwinding of the belt from the reel.

BRIEF DESCRIPTION OF THE DRAWINGS

These and other objects, features and advantages of the invention will become apparent upon consideration of the description of the preferred embodiments and the appended drawing in which:

FIG. 1 is a perspective view of a vehicle occupant compartment showing a occupant restrained by the shoulder belt;

FIG. 2 is a perspective view of a shoulder belt comfort spring of the present invention;

FIG. 3 is a sectional view taken in the direction of arrows 3—3 of FIG. 2;

FIG. 6 is a perspective view of a third embodiment of the invention;

FIG. 7 is a side elevation view of the embodiment of FIG. 6;

FIG. 8 is a perspective view of a forth embodiment of the invention;

FIG. 9 s a perspective view of a fifth embodiment of the invention;

FIG. 10 is a perspective view of a sixth embodiment of the invention;

FIG. 11 is a perspective view of a seventh embodiment of the invention;

DESCRIPTION OF THE PREFERRED EMBODIMENT

Figure 4:
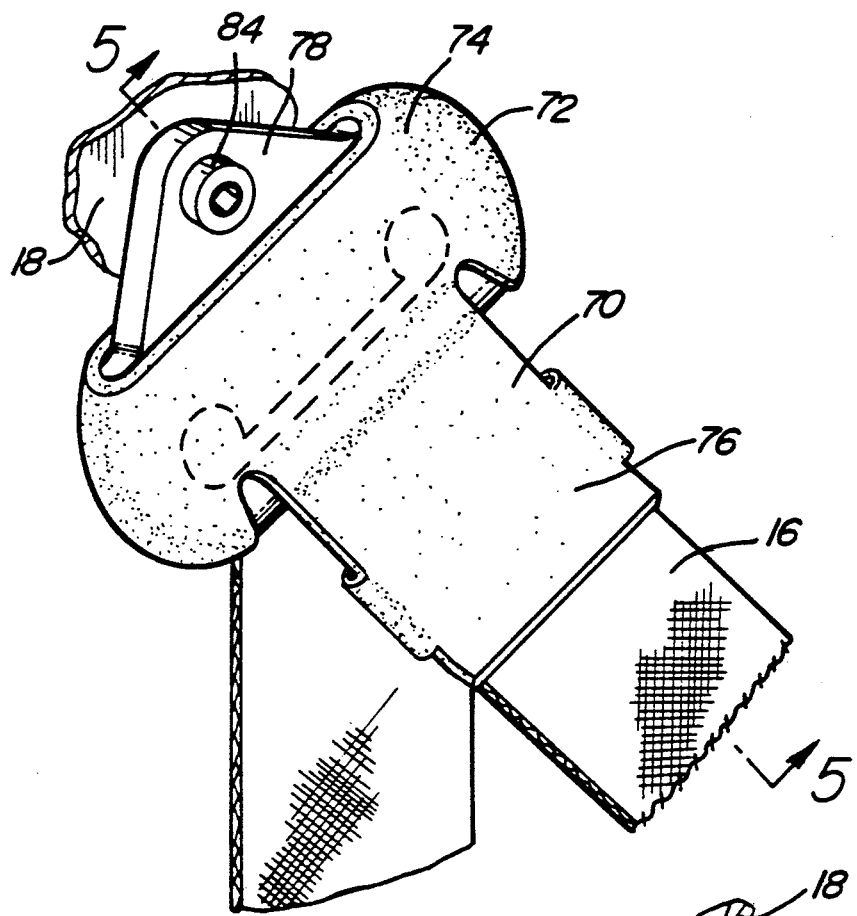
FIG. 4 is a perspective view of a second embodiment of the invention.

Referring to FIG. 1 it is seen that a motor vehicle 10 has a vehicle seat 12 supporting an occupant 14. The occupant 14 is restrained in the seat 12 by a restraint belt comprised of a shoulder belt 16 having an end mounted on pillar 18 of the vehicle body by a retractor 20. The retractor 20 has a belt reel 22 which is urged in a belt winding direction of rotation by a winding spring 24. The shoulder belt 16 is routed through a guide loop assembly 28 which is mounted high on the pillar 18 and deflects the shoulder belt 16 diagonally across the occupant upper torso to a buckle 32 which is mounted inboard the seat and latches with a latch plate 34 carried on the shoulder belt 16. As shown in FIG. 1, the lap belt 36 may be defined by an additional length of belt which is continuous from the shoulder belt 16 and is anchored at the base of the pillar 18 by an anchor plate 20.

As best seen in FIG. 2, the guide loop assembly 28 is conventionally comprised of a stamping 30 which has a circular rod 32 welded thereto and defining therewith a belt slot 34 through which the shoulder belt 16 slidably passes. The stamping 30 is pivotally mounted on the pillar 18 by a pivot bolt 38 as best seen in FIG. 3.

If the occupant leans forward from the seated position of FIG. 1, shoulder belt 16 is extended from the retractor as permitted by sliding of the belt through the belt slot 34 of the guide loop assembly 28. Likewise, if the latch plate 34 is unbuckled from the buckle 32, the shoulder belt 16 is retracted through the guide loop assembly 28 by the winding effort of the retractor spring 24 as the belt is wound and stored upon the reel 22.

Referring to FIGS. 2 and 3, it is seen that a comfort spring device generally indicated at 44 is associated with the guide loop assembly 28. In particular, it is seen that the comfort spring device 44 includes a mounting sheath 46 which is of molded plastic construction and seats upon the stamping 30. The mounting sheath 46 has a top opening 48 by which the mounting sheath 46 seats upon shoulders 50 and 52 of the stamping 30 to firmly locate the sheath 46 on the stamping 30. A spring leaf 56, also of molded plastic construction, has a generally planar shape and upper end which is pivotally connected to the sheath 46 by a pivot pin 58. The lower end of the spring leaf 56 carries in-turned flanges 58 and 60 which wrap around the edges of the shoulder belt 16 to establish the spring leaf 56 in overlying relationship with the shoulder belt 16 and permit the spring leaf 56 to pivot about the pivot 58 whenever the angle of repose of the belt 16 is changed in relation to the guide loop assembly 28.

Referring to FIG. 3, it is seen that the spring leaf 56 is shown in its normal contracted state in which the shoulder belt 16 is deflected slightly from its most direct route to the occupant torso. This contracted state of the spring leaf 56 is obtained by the spring leaf 56 having a spring strength which is stronger than the effective retracting effort of the retractor winding spring 24 pulling on the belt 16 so that the leaf spring 56 remains in the contracted state even though the retractor 20 is urging the retraction of the shoulder belt 16.

When the occupant leans forward from the solid line indicated normal seating position of FIG. 1 to the phantom line indicated position, the belt 16 is subjected to extracting force applied thereto by the occupant's sternum. This extracting force causes the spring leaf 56 to be extended to the phantom line position of FIG. 3 in which the shoulder belt 16 has assumed a more direct straight line path from the guide loop assembly to the occupant shoulder. This limited extension of the belt is obtained without the belt unwinding from the retractor 20 against the resistance of the wind-up spring and against the resistance of the friction force imposed on the belt by its contact with the rod 32 of the guide loop assembly 28. The spring leaf 56 is designed to have a spring rate of about 60 newtons per meter and a maximum extension that permits forward torso motion of 20 millimeters at low sternum loading.

Figure 12:
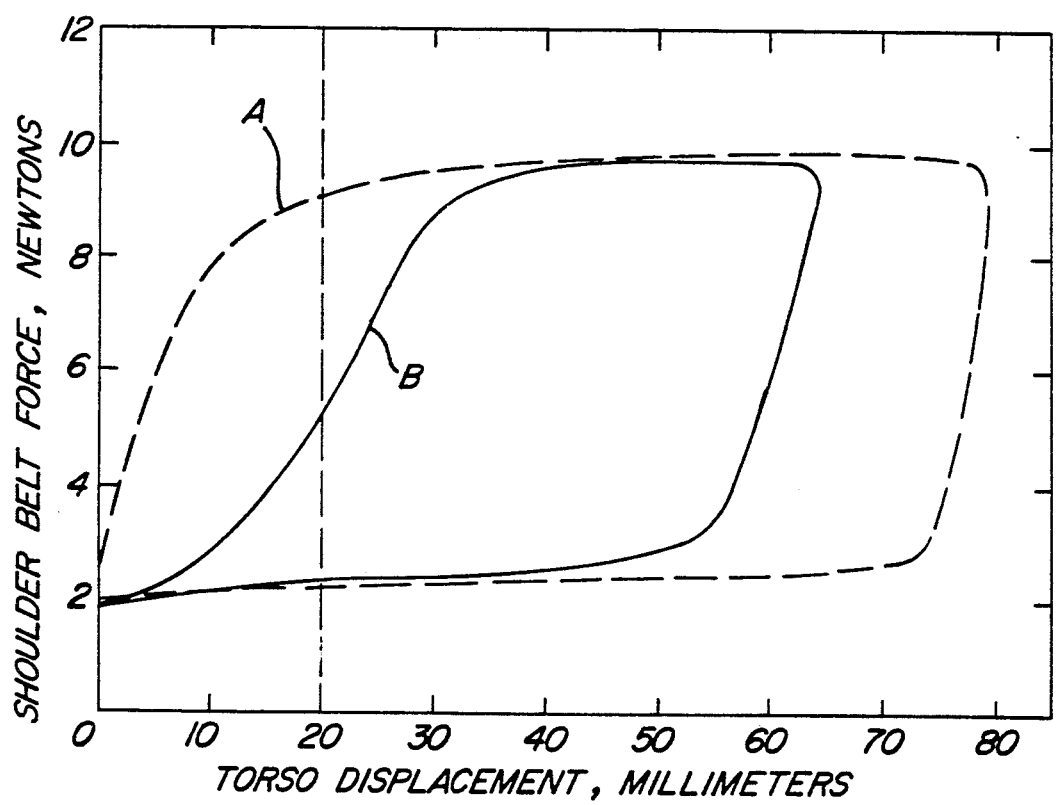
FIG. 12 is a graph plotting the belt force imposed on the occupant sternum versus the millimeters of forward torso displacement.

Accordingly, as seen by reference to the plot of FIG. 12 and the curved designated "B" thereon, the initial 20 millimeters of forward leaning displacement of the occupant torso causes the force imposed on the occupant sternum to rise from about 2 newtons to about 5 newtons so that the occupant does not experience uncomfortable tension forces during the relatively small forward leaning motions which might be induced by cornering, deceleration or even normal breathing of the occupant. However, as is seen in the plot "B", a further forward leaning motion of the occupant beyond the 20 millimeters will cause a further rapid increase in the shoulder belt force to the level of 9 newtons as the belt begins unwinding from the retractor 20 and overcomes friction of the round bar 32 of the guide loop assembly 28.

As the occupant returns rearwardly against the seat back to the solid line indicated position of FIG. 1, the spring 56 returns to its contracted FIG. 3 position and the belt is retracted by the retractor 20 and the load imposed on the sternum falls off rapidly to about 2 newtons.

Figure 5:
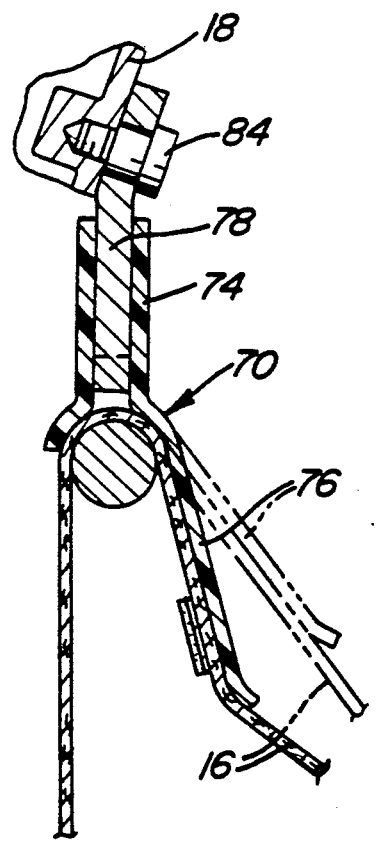
FIG. 5 is a sectional view taken in the direction of arrows 5—5 of FIG. 4.

FIGS. 4 and 5 disclose another embodiment of the invention in which is similar to FIG. 2 except that a comfort spring device generally indicated at 70 is comprised of a one piece injected molded construction which includes a mounting sheath portion 74 and an integrally connected spring leaf portion 76, which is snap fit onto the guide loop assembly 78, and overlies the belt. The embodiment of FIGS. 4 and 5 operates in the lame manner as the embodiment of FIGS. 2 and 3 except that the forward leaning movement of the occupant will necessarily cause the guide loop 78 and the comfort spring device 70 to rotate somewhat about the pivot pin 84.

Referring to FIG. 6, a third embodiment of the invention is shown in which the comfort spring device generally indicated at 90 includes a sheath 92 which snap fits over a guide loop assembly 94 and has a spring leaf 95 overlying the shoulder belt 16 and attached to the sheath 92 by a pivot 96. The spring leaf 95 has a plurality of open sided slots 98, 100, 102 and 104 therein which cooperate to define belt bearing surfaces 106, 108, 110 and 120. FIG. 6 shows the shoulder belt routed into the slot 104 so that the belt bears upon the bearing surface 120 for deflection toward the occupant shoulder. Alternatively, the shoulder belt 16 could be rerouted to bear upon the bearing surfaces 106, 108, or 110.

As seen in FIG. 7, the forward leaning motion of the occupant causes the spring leaf 95 to be deflected to the phantom line indicated piston which permits the shoulder belt 16 to follow a more direct route towards the occupant's shoulder. This yielding of the spring leaf 95 enhances the comfort of the occupant by permitting a limited degree of belt extension without extending belt from the retractor. By rerouting the belt through a selected one of the belt slots, the occupant may adjust the route and the extent of the low effort of extraction of the belt. In-turned flanges 122, 124 and 126 are provided along the edge of the spring leaf 95 and surround the edge of the belt to retain the belt in its bearing relationship within the chosen one of the belt slots 100, 102 or 104.

FIG. 8 shows a comfort spring similar to that of FIG. 6 except that the spring leaf 130 thereof has only one bearing surface 132.

FIG. 9 shows another embodiment of the invention in which the comfort spring device 140 is removably attached to the guide loop assembly 142. In this embodiment the guide loop assembly 142 includes a guide loop 146 of bent round stock which is suspended from a strap 148 attached to anchor bolt 150. A molded plastic tubular sheath 152 surrounds the strap 148. The comfort spring device 140 includes a mounting blade portion 154 which is integrally molded therewith and is designed to be inserted upwardly into the sheath 152 and become wedged between the sheath 152 and the strap 148. The comfort spring device 140 includes a spring leaf 156 which depends form the mounting blade 154 and has in turned flanged portions 158 and 159 at the bottom thereof which surround the edges of the shoulder belt 16. The spring leaf 152 yields in response to forward leaning motion of the occupant.

FIG. 10 is yet another embodiment of the invention in which the comfort spring device is generally indicated at 160 and includes a "U" shaped spring leaf 162 of molded plastic construction having in-turned flange portions 164 and 166 at the upper end of the "U" and in-turned flange portions 168 and 170 at the lower end of the "U". These in-turned flanges are preferably of circular cross section to provide optimum fit with the shoulder belt passing therethrough. The "U" shape of the spring leaf 162 introduces a degree of contraction into the belt. Then, when the occupant leans forward in the seat, the spring leaf 162 yields to permit a limited extension of the belt prior to the beginning of the extraction of the belt from the retractor.

FIG. 11 shows yet another embodiment of the invention which is applicable to rear seat shoulder belts of the type in which the shoulder belt retractor is hidden beneath the package shelf 180 of the vehicle and the belt 182 exits the package shelf 180 through a slot 184. The comfort spring device generally indicated at 186 includes a mounting clamp portion 188 which rests upon the package shelf 180 and has clip legs 190 and 192 which snap fit into the belt slot 184 and a clamp leg 194 which snap fits over a rear lip of the package shelf 180. The spring leaf 196 projects upwardly form the mounting base 188 and carries in-turned flanges 198 and 200 which surround the edges of the belt 182 to support the belt 182 in an elevated position. When the occupant leans forward, the spring leaf 196 yields to permit a limited extension of the belt prior to the unwinding of the belt from the retractor.

It will be understood that the nominal spring extension of 20 millimeters at the rate of 60 newtons per meter for the auxiliary spring is appropriate for most applications, however, adjustment to this value may be made through experimentation to provide optimum occupant comfort for a given seat belt geometry and vehicle seating condition according to the teachings of this invention.

Thus it is seen that the invention provides a new and improved comfort device for an occupant's seat belt.

The embodiments of the invention in which an exclusive property or privilege is claimed are defined as follows:

1. In a seat belt system having a shoulder belt slidably deflected across the occupant torso by a guide loop pivotally mounted on the vehicle body and wound upon a reel having a spring winding the belt taut about the occupant torso so that forward movement of the occupant in the seat is enabled by unwinding of the belt from the reel against the bias of the winding spring, the improvement comprising:

a yieldable plastic belt support mounted on the guide loop and depending therefrom to bear upon the belt between the guide loop and the occupant, said plastic belt support being a generally planar member overlying the surface of the belt and having a plurality of open sided slots entering the planar member from an edge thereof and spaced along the length thereof so that the occupant may selectively insert the belt into a chosen one of the slots, said belt support being effective to deflect the belt from the fully extended condition to a condition of limited contraction so that limited forward movement of the occupant is accommodated by yielding of the belt support permitting the belt to extend without unwinding of the belt from the reel.

* * * * *